United States Patent
Kuffner, Jr.

(10) Patent No.: US 9,665,800 B1
(45) Date of Patent: May 30, 2017

(54) RENDERING VIRTUAL VIEWS OF THREE-DIMENSIONAL (3D) OBJECTS

(71) Applicant: Google Inc., Mountain View, CA (US)

(72) Inventor: James J. Kuffner, Jr., Mountain View, CA (US)

(73) Assignee: Google Inc., Mountain View, CA (US)

( * ) Notice: Subject to any disclaimer, the term of this patent is extended or adjusted under 35 U.S.C. 154(b) by 392 days.

(21) Appl. No.: 14/059,082

(22) Filed: Oct. 21, 2013

Related U.S. Application Data (60) Provisional application No. 61/716,607, filed on Oct. 21, 2012.

(51) Int. Cl.
  *G06K 9/62* (2006.01)
  *G06T 15/50* (2011.01)
  *G06K 9/00* (2006.01)

(52) U.S. Cl.
  CPC ....... *G06K 9/6256* (2013.01); *G06K 9/00208* (2013.01); *G06T 15/50* (2013.01)

(58) Field of Classification Search
  None
  See application file for complete search history.

(56) References Cited

U.S. PATENT DOCUMENTS

| | | | |
|---|---|---|---|
| 2007/0058836 A1* | 3/2007 | Boregowda | G06K 9/00771 382/103 |
| 2009/0256837 A1* | 10/2009 | Deb | G06T 19/003 345/419 |
| 2010/0158356 A1* | 6/2010 | Ranzato | G06K 9/6256 382/159 |
| 2011/0002531 A1* | 1/2011 | Heisele | G06K 9/00208 382/154 |
| 2012/0176478 A1 | 7/2012 | Wang et al. | |
| 2012/0177283 A1 | 7/2012 | Wang et al. | |

OTHER PUBLICATIONS

Yan, Pingkun, Saad M. Khan, and Mubarak Shah. "3d model based object class detection in an arbitrary view." Computer Vision, 2007. ICCV 2007. IEEE 11th International Conference on. IEEE, 2007.*
"Blender." (n. d.): 115. Blender Index Release 2.61.0—API. Dec. 21, 2011. Web. Aug. 16, 2016. <https://www.blender.org/api/blender_python_api_2_61_0/blender_python_reference_2_61_0.pdf>.*

* cited by examiner

*Primary Examiner* — Vu Nguyen
(74) *Attorney, Agent, or Firm* — McDonnell Boehnen Hulbert & Berghoff LLP (57) ABSTRACT

Methods and systems for rendering virtual views of three-dimensional (3D) object data models are described. An example method may include receiving information associated with rendering a 3D object data model, and determining virtual views for rendering the 3D object data model. Based on the virtual views and the received information, synthetic training images of the object may be rendered, and information identifying a given virtual view used to render a synthetic training image may be stored with the synthetic training images. A visual object recognition module may determine from a plurality of images and image that substantially matches one or more of the synthetic training images, and the matched image may be associated with information identifying the object and a virtual view used to render a matching synthetic training image. Another method may also leverage information from a synthetic training image to help recognize other objects of the matched image.

11 Claims, 9 Drawing Sheets

Computer Program Product 900

Signal Bearing Medium 901

Program Instructions 902

- receiving information associated with rendering a three-dimensional (3D) object data model of an object, wherein the received information includes information identifying the object;

- determining one or more virtual views for rendering the 3D object data model;

- storing with the synthetic training images information identifying a given virtual view used to render a given synthetic training image;

- determining from a plurality of images an image that substantially matches one or more of the synthetic training images using a visual object recognition module, wherein the visual object recognition module is configured to utilize the synthetic training images to determine the matched image; and

- associating the information identifying the object and information identifying a virtual view used to render a matching synthetic training image with the matched image.

| Computer Readable Medium 903 | Computer Recordable Medium 904 | Communications Medium 905 |

FIGURE 9

RENDERING VIRTUAL VIEWS OF THREE-DIMENSIONAL (3D) OBJECTS

CROSS-REFERENCE TO RELATED APPLICATIONS

This application claims the benefit of U.S. Provisional Application No. 61/716,607 filed on Oct. 21, 2012, the entirety of which is herein incorporated by reference.

FIELD

This disclosure relates to visual object recognition, and in examples, to synthetic training images for visual object recognition that are rendered using 3D objects.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or based on data from objects that are scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

In some examples, a display of a 3D object data model may be accompanied by an interface for modifying or interacting with a rendering of the 3D object data model. A virtual view of the 3D object data model may be controlled by specifying a point of view for the 3D object data model. The point of view may be determined based on a camera position or orientation that is selected. In some instances, an orthographic projection or a perspective projection may be determined based on the camera position. In addition, lighting conditions may be selected to modify appearances of surfaces of the 3D object data model in the virtual view.

SUMMARY

In one example aspect, a method is provided that comprises receiving information associated with rendering a three-dimensional (3D) object data model of an object. The received information may include information identifying the object. The method may also include determining one or more virtual views for rendering the 3D object data model, and rendering synthetic training images of the object based on the one or more virtual views and the received information. Information identifying a given virtual view used to render a given synthetic training image may be stored with the synthetic training images. The method may further include determining from a plurality of images an image that substantially matches one or more of the synthetic training images using a visual object recognition module. The visual object recognition module may be configured to utilize the synthetic training images to determine the matched image. According to the method, information identifying the object as well as information identifying a virtual view used to render a matching synthetic training image may be associated with the matched image.

In another example aspect, a non-transitory computer-readable memory having stored thereon instructions executable by a computing device to cause the computing device to perform functions is provided. The functions may comprise receiving information associated with rendering a three-dimensional (3D) object data model of an object. The received information may include information identifying the object. The functions may also include determining one or more virtual views for rendering the 3D object data model, and rendering synthetic training images of the object based on the one or more virtual views and the received information. Information identifying a given virtual view used to render a given synthetic training image may be stored with the synthetic training images. The functions may further include determining from a plurality of images an image that substantially matches one or more of the synthetic training images using a visual object recognition module. The visual object recognition module may be configured to utilize the synthetic training images to determine the matched image. According to the functions, information identifying the object as well as information identifying a virtual view used to render a matching synthetic training image may be associated with the matched image.

In yet another example aspect, a method is provided that comprises receiving a query image, and matching a first portion of the query image to an object using a visual object recognition module. The visual object recognition module may be configured to utilize information from training corpora to match the first portion to a synthetic training image of the object. Synthetic training images may be training images of a given object that are rendered based on a given three-dimensional (3D) object data model of the given object. The method may also include determining a scale between a dimension of the object and a corresponding dimension in the first portion of the query image. Information stored with the synthetic training image may identify the dimension of the object. The method may further include determining synthetic training images of multiple other objects matching to a second portion of the query image using the visual object recognition module, and determining additional scales for the multiple other objects. The additional scales may be determined based on dimensions of the multiple other objects and a corresponding dimension in the second portion of the query image. According to the method, possible matches to the multiple other objects may be ranked based on proximities of the additional scales to the first scale.

In still another example aspect, a system is provided that comprises a rendering component, a visual object recognition component, and an annotation component. The rendering component may be configured to render synthetic training images of an object using multiple virtual views for a three-dimensional (3D) object data model of the object. Additionally, the rendering component may be configured to store with the synthetic training mages information identifying a given virtual view used to render a given synthetic training image. The visual object recognition component may be configured to match a portion of an image of a plurality of images to one or more of the synthetic training images. Also, the annotation component may be configured to associate information identifying the object as well as information identifying a virtual view used to render a matching synthetic training image with the matching portion.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for rendering virtual views of three-dimensional (3D) object data models. In some instances, the rendered virtual views may help to improve semantic understanding and tagging of collections of images and videos. An example method may include leveraging a 3D object data model to generate training images of objects for matching and tagging. For instance, the training images may be utilized by a visual object recognition module to identify images or videos of an object, and the identified images or videos may be annotated with information identifying the object.

In one example, information associated with a 3D object data model for an object, as well as one or more virtual views for rendering the object, may be determined. In some instances, a virtual view may include one or more camera positions specifying a point of view from which the object is rendered. The virtual view may also include lighting conditions associated with an appearance of portions of the object. Multiple synthetic training images of the object may be rendered based on the virtual views.

As used herein, a synthetic training image may be an image of an object that is rendered by one or more computing devices based on a 3D object data model of the object, as opposed to a "true" training image that is created by capturing an image of the object using a camera. By way of example, a synthetic training image may be a two-dimensional image that is rendered based on a particular orientation and/or camera position that specify a point of view of a 3D object data model.

Additionally, a visual object recognition module, configured to utilize the synthetic training images, may determine images matching the synthetic training images, and information identifying the object rendered in the synthetic training images may be associated with the matching images. In some instances, the synthetic training images of the object may be clean training images without background clutter which may negatively impact image matching. The synthetic training images may be of any pixel size and/or resolution, and may be images that are rendered proportionally correct according to dimensions of the object as specified by the 3D object data model.

Figure 1:
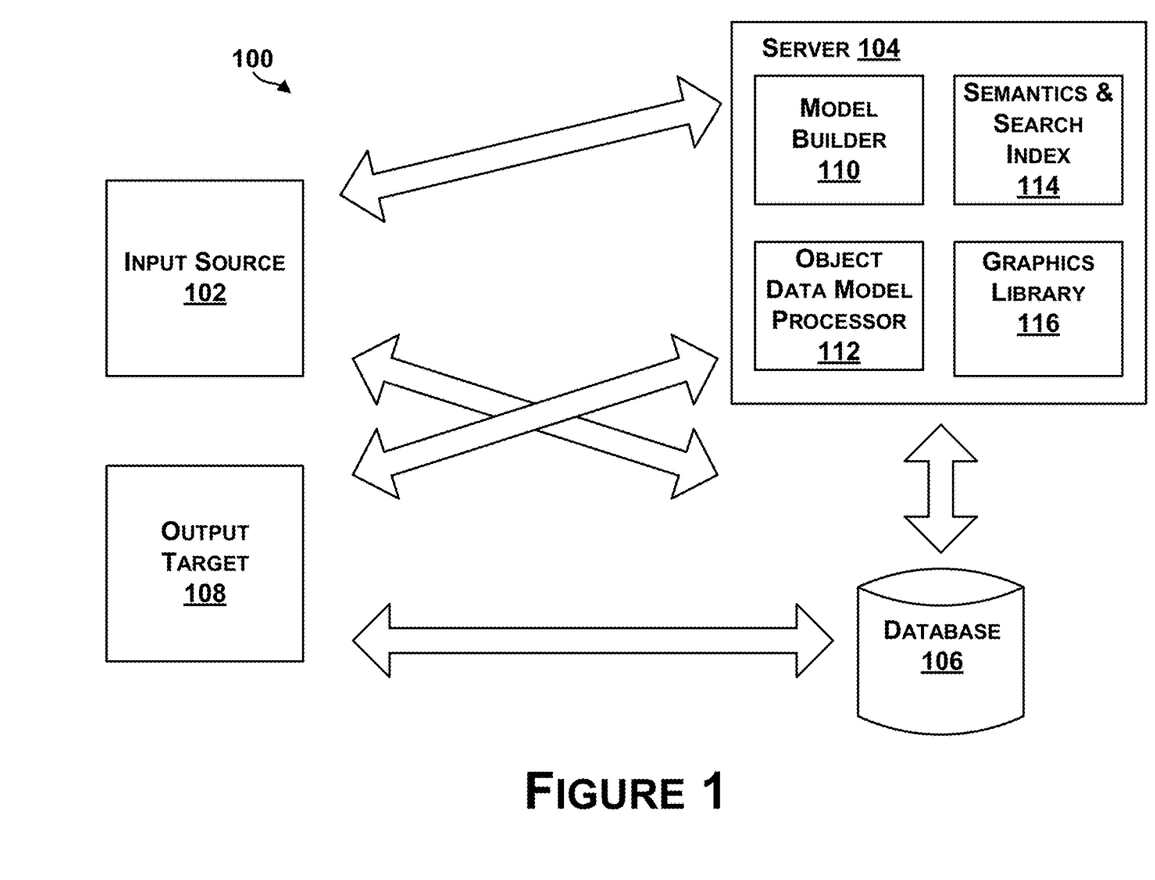
FIG. 1 illustrates an example system for object data modeling.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model, or 3D model, may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no UV unwrapping to generate a mesh (D) with UV unwrapping but no colors. UV unwrapping refers to the unwrapping of a 3D mesh to a 2D space for texturing purposes, where the 2D space is denoted, by convention, with "u" and "v" coordinates since "x", "y", and "z" are used for 3D space. As an example, for a single output texture pixel of an image, processing may include, for a given point in UV, determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model.

Figure 2:
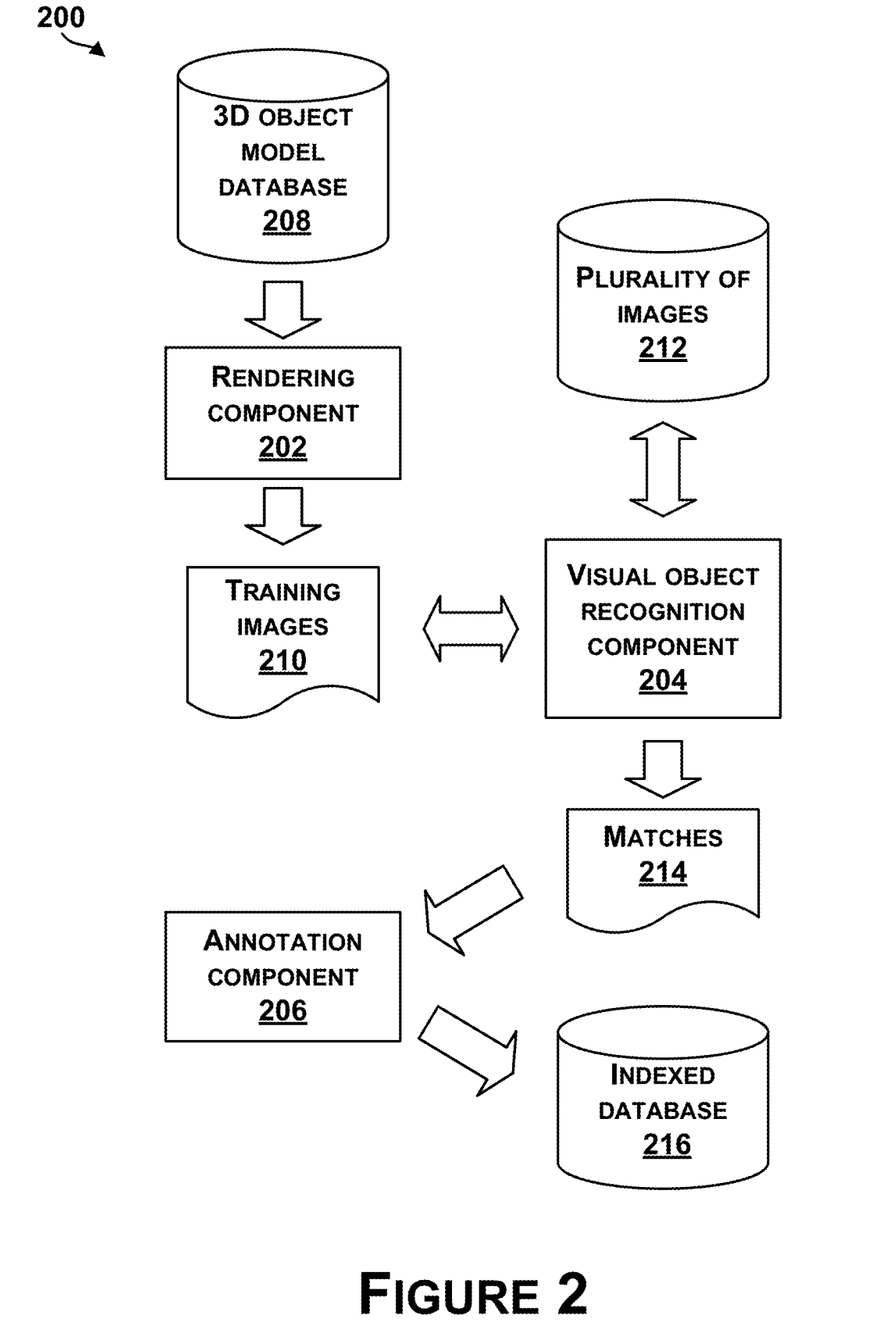
FIG. 2 illustrates an example system for rendering virtual views of three-dimensional (3D) objects.

FIG. 2 illustrates an example system 200 for rendering virtual views of three-dimensional (3D) objects. The system 200 may include a rendering component 202, a visual object recognition component 204, and an annotation component 206. Each of the components may include any type of processor and any type of memory for executing functions of the components or storing instructions for executing the functions of the components. Additionally, any of the components may be circuitry wired to perform one or more programming instructions.

In one example, the rendering component 202 may be configured to render synthetic training images of an object using multiple virtual views for a 3D object data model of the object. Information associated with the 3D object data model may be received from a 3D object data model database 208 of 3D objects. The 3D object data model database 208 may be similar to the database 106 of FIG. 1. The 3D object data model database 208 may include data associated with a geometric shape of one or more objects as well as texture mapping information for surfaces of the one or more objects. Virtual views for the object, including camera positions and lighting conditions for the objects may be determined by the rendering component 202. In some instances, the virtual views may be determined based on a predetermined pattern or sequence of viewpoints and lighting conditions. In other instances, the rendering component 202 may receive as input information specifying one or more virtual views to be rendered.

In some instances, based on the determined virtual views and the information associated with a 3D object data model of an object, rendered images of the object may be output as training images 210. The training images 210 may be stored in a database and may include information identifying virtual views used to render the training images 210. For instance, information identifying a given virtual view used to render a training image may be stored with the training image in the database. In some examples, the rendering component 202 may output separate training images 210 for multiple objects using a same or different set of virtual views. In other instances, the rendering component 202 may output a training image that includes two or more objects rendered within a scene based on multiple 3D object data models.

The training images 210 may be used by the visual object recognition component 204 to match a portion of an image from a plurality of images 212 to the object. For example, the visual object recognition component 204 may be trained using machine learning based on the training images 210. Given an image from the plurality of images 212, the visual object recognition component 204 may retrieve and output training images that are similar to the image. For instance, the retrieved training images may have image descriptors or image templates similar to the image or a portion of the image. In a further instance, the number of similar image descriptors may be above a threshold, and a given training image may be determined to be a match to the image.

Additionally, for each similar training image, a match score may be provided. For example, the match score may be computed based on a combination of one or more of a number of matched descriptors between a matched image and a training image, a computed similarity between raw image data of a matched image and a training image, or other potential image comparison algorithms or methods. Other example methods and techniques used for image matching may include template matching based on color histograms or other feature based matching techniques. The examples are not meant to be limiting, and the visual object recognition component 204 may match the training images 210 to one or more images based on any type of image matching.

The visual object recognition component 204 may be configured to output one or more matches 214 to the annotation component 206. The one or more matches may include information identifying an image from the plurality of images 214, and optionally a portion of the image, matching to one or more of the training images 210. In some instances, the matches 214 may include information identifying a training image to which a matched image most closely matches based on a match scores between the image and matching training images.

In some examples, based on the matches 214, the annotation component 206 may associate information identifying an object rendered in the matching training image as well as information identifying a virtual view used to render the matching training image with the matching image from the plurality of images 212. In some instances, the system 200 may be used to find instances of an object from the 3D object model database 208 within the plurality of images 212, and index the instances of the object with information identifying the object. The instances of the object may be included within an indexed database 216 of images, for example. Subsequently, the indexed database 216 may be queried such that images associated with the object are returned.

Figure 3:
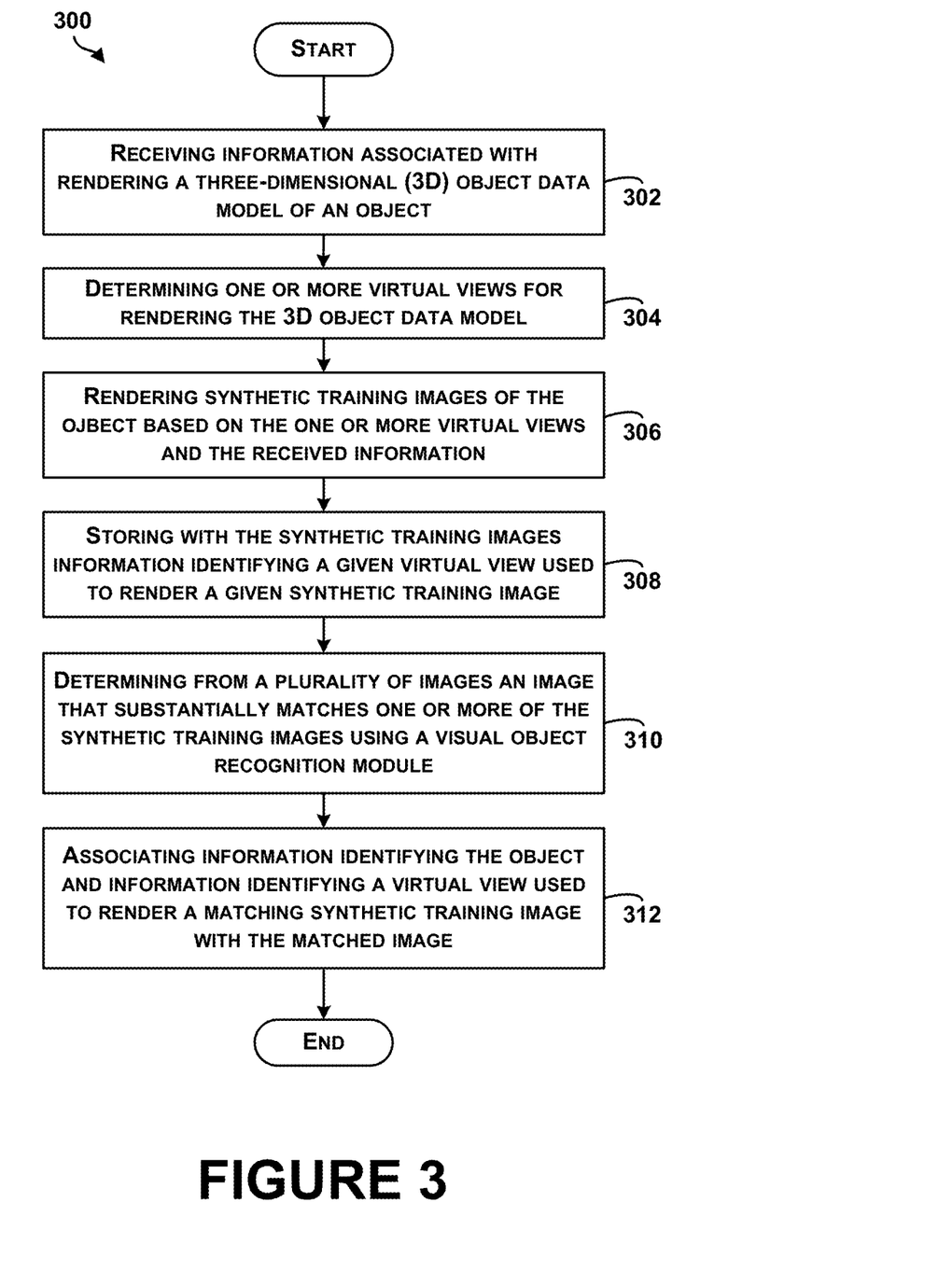
FIG. 3 is a block diagram of an example method for rendering virtual views of three-dimensional (3D) object data models.

FIG. 3 is a block diagram of an example method 300 for rendering virtual views of three-dimensional (3D) object data models. Method 300 shown in FIG. 3 presents an embodiment of a method that could be used by the system 200 of FIG. 2, for example. Method 300 may include one or more operations, functions, or actions as illustrated by one or more of blocks 302-312. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

Initially, at block 302, the method 300 includes receiving information associated with rendering a 3D object data model of an object. The received information may include information to convert a 3D model of an object into images with photorealistic effects. In some instances, the information may be used to render a two-dimensional image of the object. For example, the information may include geometric shape details and surface details such as texture, reflection/scattering, and shading information used to describe appearance of an object. In some instances, the information may include information identifying the object and/or portions of the object. For example, the information may identify a type or class of the object, materials used to render portions of the object, geometric dimensions of portions of the object, or other details associated with the object.

At block 304, the method 300 includes determining one or more virtual views for rendering the 3D object data model. A virtual view of an object may include information describing one or more camera positions, and associated points of view, as well as lighting conditions of the object such as reflection/scattering and shading affecting appearance of the object. In some examples, multiple virtual views for rendering the 3D object may be determined in order to capture multiple points of view of the 3D object from different camera angles and/or lighting conditions. For example, the multiple virtual views may include camera angles spaced around the 3D object at varying eye levels. In other examples, the virtual views may include low angle, oblique angle, high angle, bird's eye, or other angles of view of a front, back, sides, top, or bottom, of an object. However, any combination of camera positions and orientations with respect to a position of the 3D object is possible.

In addition, the virtual views may include one or more appearance models for lighting conditions of the 3D object. The lighting conditions may include various reflection and shading models for a 3D object. Reflection/scattering models may describe how light interacts with a surface at a given point due to different incoming illuminations of an object, for example, while shading models may address how different types of scattering are distributed across a surface of the object to depict depth perception. In some examples, an angle and/or position of an illumination source, such as the sun or another illumination source, may be varied to create different virtual views. In one instance, the illumination source may include sunlight at high noon. In another instance, the lighting conditions may be set to represent illumination from candlelight in a dark room. Thus, many virtual views of an object may be determined by varying camera positions and/or lighting conditions of the 3D object.

At block 306, the method 300 includes rendering synthetic training images of the object based on the one or more virtual views and the received information. For instance, one or more synthetic training images of the object may be generated at the determined virtual views for the object. In some examples, the synthetic training images may be considered "clean" training images because the synthetic training images may be rendered without any background clutter. The information associated with the 3D object data model may be used to render any size of training image for a given virtual view. For instance, a 100-by-100 pixel image and/or a 5000-by-5000 pixel of an object may be rendered for a given virtual view. Similarly, any virtual view may be rendered under any of the lighting conditions associated with a 3D object data model. For instance, different shader programs may be used or images may be rendered with and/or without shadows. In another instance, synthetic training images may be rendered at different times of day such that illumination of the object varies based on an angle of the sun with respect to a position of the object throughout a day.

At block 308, the method 300 includes storing with the synthetic training images information identifying a given virtual view used to render a given synthetic training image. For example, information associated with a camera position and/or lighting conditions for a virtual view used to render a synthetic training image may be stored with the synthetic training image. In some examples, the information associated with the camera position may include a relative offset or distance to the camera from a position of the object and/or an angle of the camera. Information associated with lighting conditions may include a reflection and/or shading model as well as parameters associated with the models, for example.

In some examples, the stored information may be metadata associated with a synthetic training image. In other examples, the stored information may be information accessed from a lookup table or other type of database. In some instances, the stored information may include an indication of what at an object is or information used to compute a size of an object based on a relative camera offset.

At block 310, the method 300 includes determining from a plurality of images an image that substantially matches one or more of the synthetic training images using a visual object recognition module. The visual object recognition module may be configured to utilize the synthetic training images to determine the matched image. In some examples, the visual object recognition module may also determine a portion of the matched image that matches the one or more of the synthetic training images. For instance, the visual object recognition component 204 of FIG. 2 may be used to determine the portion of the matched image that matches the one or more of the synthetic training images.

For example, for one or more images of the plurality of images, the visual object recognition module may output synthetic training images that are similar to the one or more images. For instance, image descriptors for the images of the plurality of images may be determined. In one example, image descriptors for a given image may be grouped into one or more image templates describing the given image. The visual object recognition module may utilize content based image retrieval techniques to determine synthetic training images similar to the one or more images. In some examples, images may be compared based on distance measures between content of the images. For example, a distance of zero may be indicative of a close match between two images. Distance measures may be computed between colors, textures, shapes, or other characteristics of images. In other examples, nearest neighbor searching algorithms may be used to find an image or image descriptor within the synthetic training images that is closest to an image from the plurality of images.

In some examples, based on a distance measure between two potentially matching images, a determination may be made whether the two images match. For instance, a match score may be computed based on a combination of one or more of a number of matched descriptors between an image and a synthetic training image, a computed similarity between raw image data of two images, or other potential image comparison algorithms or methods. Other example methods and techniques used for image matching may include template matching based on color histograms or other feature based matching techniques. The examples, however, are not meant to be limiting, any type of image matching may be performed.

The plurality of images may be an un-indexed or unlabeled set of images of objects. For example, the images may be user submitted images or images from one or more webpages or databases. In some examples, the plurality of images may include videos or frames of videos.

At block 312, the method 300 includes associating information identifying the object and information identifying a virtual view used to render a matching synthetic training image with the matched image. In some examples, the associated information may be stored as metadata with the matched image. In other examples, the associated information may be stored in a database that is used to return results of a query for images of or associated with an object. In an instance in which the visual object recognition module determines a portion of the matched image matching the synthetic training image, the matched portion may be annotated with information identifying the object and the virtual view used to render the matching synthetic training image.

In an instance in which the matched image is a given frame of a video, the video may be annotated with information indicating the object is present in the given frame. In a further example, the visual object recognition module may match a first frame of a video to a first synthetic training image rendered using a first virtual view and match a second frame to a second synthetic training image rendered using a second virtual view that is different from the first virtual view. Based on the occurrence of the object in multiple frames, a processor may determine that the video is related to the object. Thus, an object may be identified across multiple frames of a video from different viewpoints as the object moves through pixels of the video.

In an instance in which the visual object recognition module utilizes information from synthetic training images as well as training images that are not rendered based on a 3D object data model, the matched image may be annotated with information indicating that a matched image matches to a synthetic training image. In some examples, the fact that a matched image matches to a synthetic training image may be used to differentiate between results returned by an index in response to a query for information about the object. For instance, matched images matching to synthetic training images may be given higher priority among results than matched images that do not match to synthetic training images.

Any of the blocks of the method 300 may be performed by a computing device having a processor and a memory or a combination of computing devices. In some examples, one or more of the computing devices may be accessed locally or remotely via a network and a server. For example, a first computing device in a server may receive from a second computing device the information associated with rendering the 3D object data model of the object. The first computing device may determine the one or more virtual views, render the synthetic training images of the object, store information identifying the virtual views with the synthetic training images and send the synthetic training images and the stored information to the second computing device. The second computing device may send the synthetic training images to a third computing device that may perform the remaining blocks of the method 300.

Figure 4A:
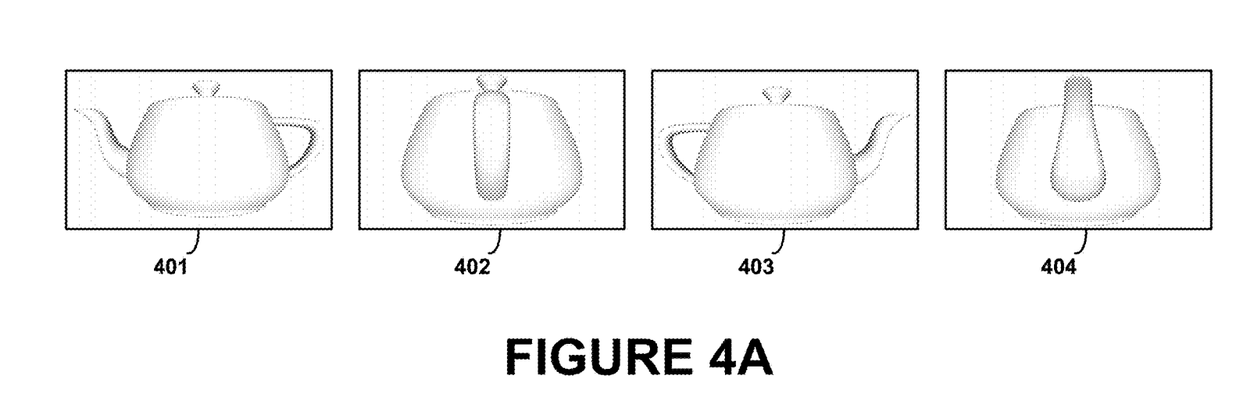
FIGS. 4A-4B are example illustrations of synthetic training images.
Figure 4B:
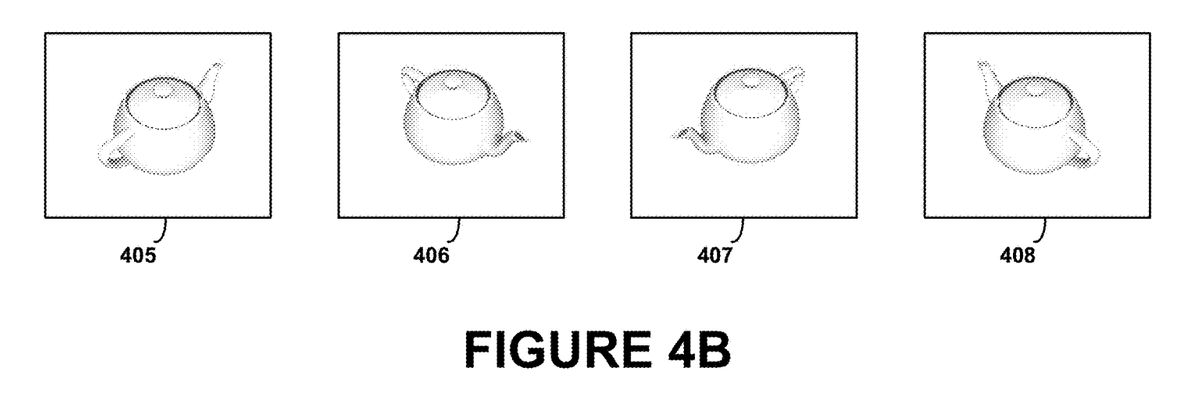

It is contemplated that any combination of camera positions and lighting conditions may be used to determine any number of virtual views for an object. FIGS. 4A-4B are example illustrations of synthetic training images 401-408. As shown in FIG. 4A, multiple synthetic training images of different sides of a 3D object may rendered by orbiting or moving a camera position around the 3D object. For instance, synthetic training images 401-404 may be captured based on a virtual view which results in a teapot that is presented at eye-level. For example, synthetic training image 401 is rendered based on a front view of the teapot. Similarly, synthetic training images 402 and 404 are rendered based on side views of the teapot, while synthetic training image 403 is rendered based on a back view of the teapot.

As shown in FIG. 4B, synthetic training images 405-408 may be rendered based on a different viewpoint than the synthetic training images 401-404. For example, the synthetic training images 405-408 may be rendered from a high camera angle such that portions of the teapot are visible from above. In one example, the synthetic training images 405-408 may be rendered by modifying the camera position as if a viewer was walking around the teapot. For instance, synthetic training images 405-408 may describe four separate viewpoints such that each side of the teapot, front, left side, right side, and back, is visible in at least one of the synthetic training images 405-408

The synthetic training images 401-408 conceptually illustrated in FIGS. 4A-4B are not meant to be limiting. In other instances, more or less synthetic training images may be rendered based on any number of virtual views of a 3D object from any camera orientation relative to the orientation of the 3D object.

Figure 5:
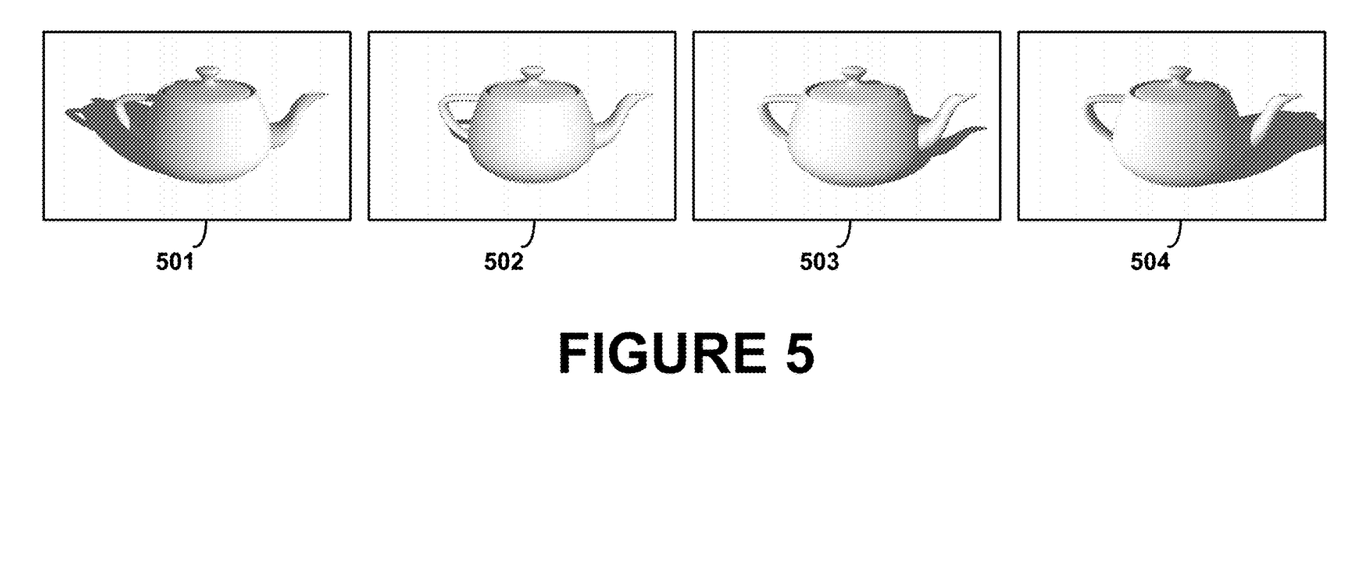
FIG. 5 is another example illustration of synthetic training images.

FIG. 5 is another example illustration of synthetic training images 501-504. As shown in FIG. 5, multiple synthetic training images of an object may be rendered based on various lighting conditions for the object. The synthetic training images 501-504 conceptually illustrate varying lighting conditions associated with virtual views from which training images of a teapot may be rendered. The synthetic training image 501, for example, is rendered based on camera position that is above the teapot with sunlight illuminating a side of the teapot near a spout of the teapot. Similarly, synthetic training images 502-504 illustrate sunlight illuminating different locations on the surface of the teapot. In one example, the synthetic training images 501-504 may represent renderings of the teapot in a fixed position as a position of an illumination source, such as sunlight, varies. In other examples, the synthetic training images 501-504 may be rendered without shadows or with multiple illumination sources. In another example, the synthetic training images 501-504 may be rendered according to different parameters for reflection or shading models of a 3D object.

Figure 6:
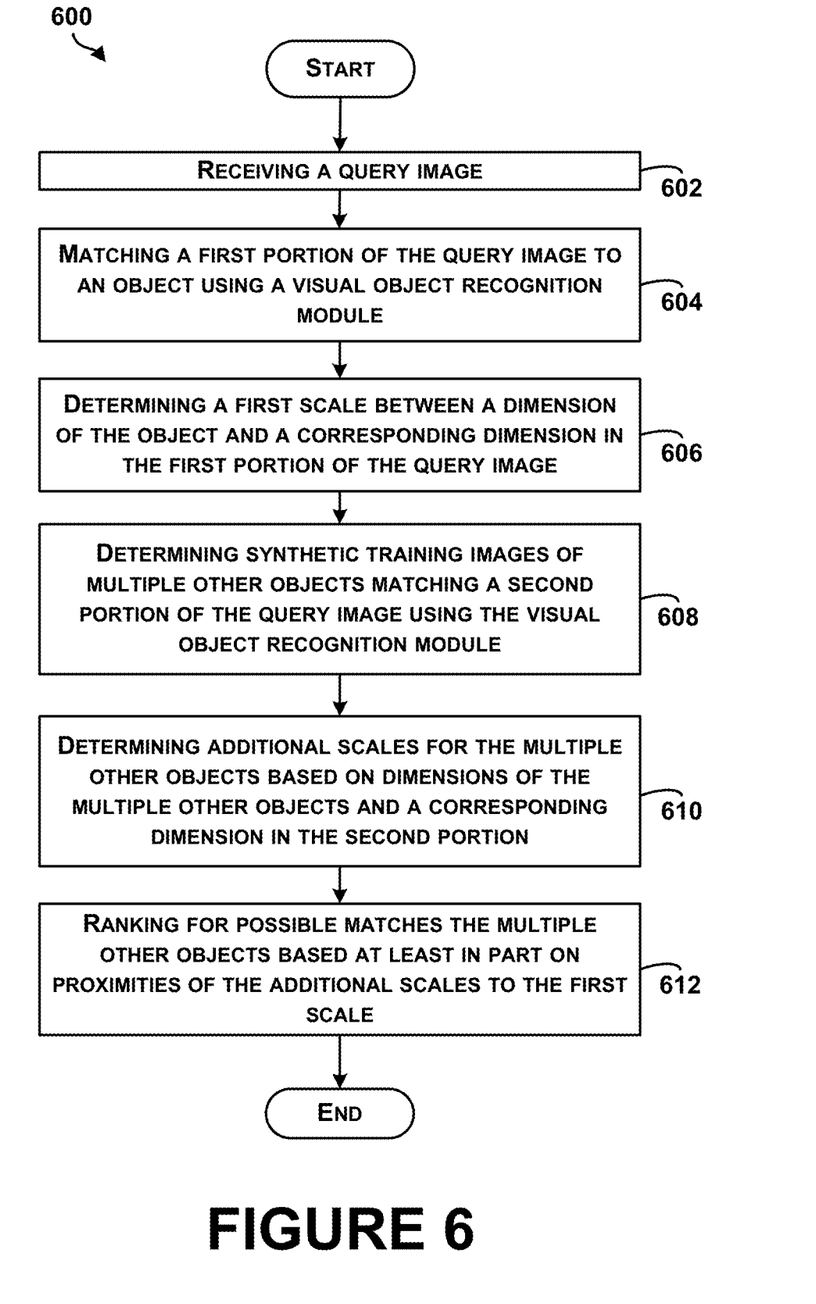
FIG. 6 is a block diagram of an example method for visual object recognition.

In some examples, given the availability of a set of synthetic training images, visual object recognition may be improved. FIG. 6 is a block diagram of an example method 600 for visual object recognition. The method 600 shown in FIG. 6 presents an embodiment of a method that may, for example, be used by the system 100 of FIG. 1. Method 600 may include one or more operations, functions, or actions as illustrated by one or more of blocks 602-612. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method. Each block may represent a module, a segment, or a portion of program code, which includes one or more instructions executable by a processor for implementing specific logical functions or steps in the process. In addition, each block in FIG. 6 may represent circuitry that is wired to perform the specific logical functions in the process.

Initially, at block 602, the method 600 includes receiving a query image. The query image may be one or more images submitted by one or more users or an image selected by a processor from a collection of images. The query image may be of any size, shape, and/or form. Similarly, the query image may be or include two-dimensional, e.g., photographs, figures, pictures, or three-dimensional, e.g., a hologram, three-dimensional model, etc. The query image may be captured by stationary or mobile optical devices such as cameras, cellular phones, wearable computing devices, etc., or otherwise input by a system or a user, e.g., a visual sketch drawn or otherwise rendered on an input surface. In one example, the query image may be a static frame captured from a moving image.

In some examples, the query image may be received in order to find images matching the query image, or to find out information about the query image, for example. In some examples, the query image may be an image provided in order to perform content-based image retrieval. Content from within the images may be analyzed, and training images matching the content of the images may be returned. For example, content of images within the query image may refer to colors, shapes, textures, or other information derived from an image.

The query image may be of one or more of any number of image file formats. For example, the query image may include one or more image files composed of either pixel or vector data that are rasterized to pixels when displayed in a vector graphic display. Example image file formats include JPEG, JPEG 2000, TIFF, RAW, PNG, GIF, BMP, among other possible image file formats.

At block 604, the method 600 includes matching a first portion of the query image to an object using a visual object recognition module. For example, the first portion of the query image may be an image of the object. The visual object recognition module may be configured to utilize information from training corpora to match the first portion to a synthetic training image of the object as described with respect to the visual object recognition component 204 of FIG. 2. In one instance, synthetic training images may be training images of a given object that are rendered based on a given 3D object data model of the given object.

In one example, the training corpora may include synthetic training images for multiple objects, and the visual object recognition module may determine an object the first portion of the query image matches by determining a synthetic training image to which the first portion best matches. Various content based image retrieval methods may be used to match the first portion of the query image to an object based on the synthetic training images. For example, a degree of match or match score may be determined for potential matches between the first portion and any synthetic training images, and a synthetic training image having a highest degree of match may be identified. In some instances, nearest neighbor search algorithms may be used to determine image descriptors of the synthetic training images matching to an image template of image descriptors for the first portion. The best matching synthetic training image may include stored information indicating an identity of the object rendered in the synthetic training image, and the identity of the object may be retrieved from the stored information.

At block 606, the method 600 includes determining a first scale between a dimension of the object and a corresponding dimension in the first portion of the query image. In some instances, the scale may be a ratio between a number of pixels in the query image forming a dimension of the object (e.g., height, length, width, etc.) and a dimension of the object as determined based on a 3D object data model of the object used to render the synthetic training image. For instance, the ratio may be 100 pixels to 1 inch. The synthetic training image may include information stored with the synthetic training image which indicates dimensions of the object, and the stored information may be retrieved to determine the first scale.

At block 608, the method 600 includes determining synthetic training image of multiple other objects matching a second portion of the query image using the visual object recognition module. For instance, a second portion of the query image may be associated with a second object, and matching synthetic training images from the training corpora may be identified by the visual object recognition module.

At block 610, the method 600 includes determining additional scales for the multiple other objects based on dimensions of the multiple other objects and a corresponding dimension in the second portion. For example, one or more additional scales between a dimension of another object matching the second portion and a corresponding dimension in the second portion of the query image may be determined. Similar to the first scale, the additional scales may be ratios between a number of pixels associated with the second portion of the query image and a corresponding unit of length of a 3D object that is used to render a potentially matching synthetic training image.

At block 612, the method 600 includes ranking for possible matches the multiple other objects based at least in part on proximities of the additional scales to the first scale. In one example, the first scale may be used to rule out, up-rank, or down-rank objects too large or too small to show up in the query image based on the size of the first image. For example, a second object and an associated second scale that is farther away from the first scale than a third object and an associated third scale would be less likely to appear in the query image than the third object. In some instances, proximities between the additional scales and the first scale may be one of multiple factors taken into consideration by a processor when determining a degree of match between the second portion and the multiple other objects.

Any of the blocks of method 600 may be performed by one or more computing devices having a processor and a memory. For instance, the one or more computing devices may local computing devices and/or computing devices accessed via a network and a server.

Figure 7A:
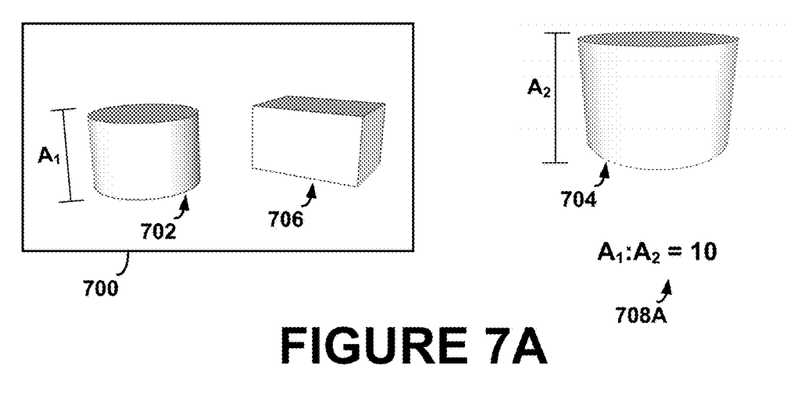
FIGS. 7A-7B are example conceptual illustrations of ranking multiple objects matching a portion of an image
Figure 7B:
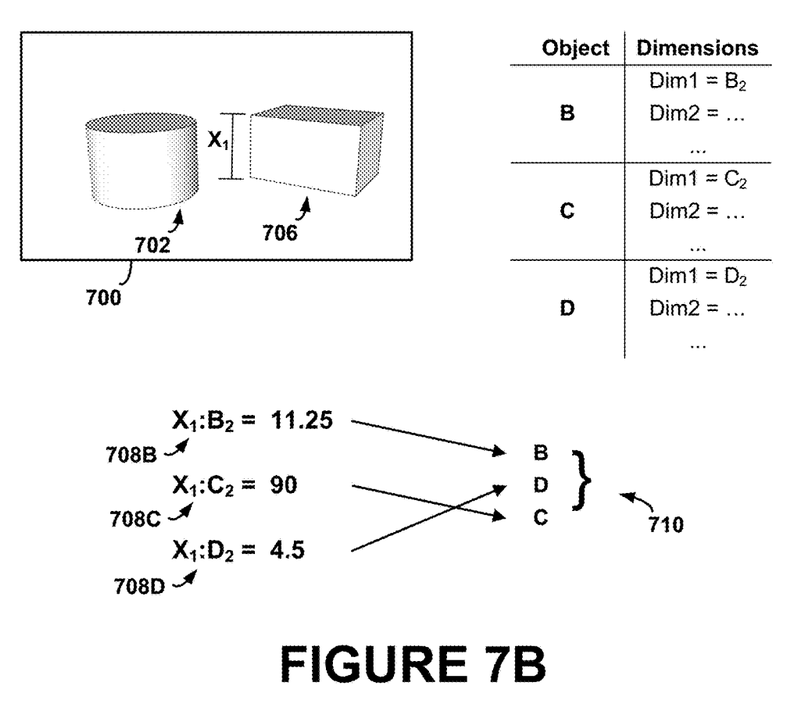

FIGS. 7A-7B are conceptual illustrations of ranking multiple objects matching a portion of an image 700. The image 700 may include multiple portions matching to synthetic training images of objects as determined by a visual object recognition module. In one example, a first portion 702 of the image 700 may match to a first synthetic training image of a first object 704. Also, a second portion 706 of the image 700 may match to multiple synthetic training images of multiple other objects.

In one instance, based on information stored with the synthetic training image of the first object 704, a first scale 708A between a dimension, '$A_1$', of the first portion 702 and a corresponding dimension, '$A_2$', of the first object 704 may be determined. For example, the first scale 708A may be one hundred pixels to ten inches or '10' based on a height of the first object 704.

Additional scales 708B, 708C, 708D may be determined based on dimensions of the multiple objects. For example, information stored with the synthetic training images of the multiple objects may include dimensions of the multiple objects, and the stored information may be retrieved. Based on the stored information and a dimension '$X_1$' of the second portion 706 in the image 700, the additional scales 708B, 708C, 708D may be determined.

In one example, the multiple objects 'B', 'C', and 'D' may be ranked based on proximities of the additional scales 708B, 708C, 708D to the first scale 708A. In one example, proximities may be determined based on an absolute value of a difference between two scales; however, other methods for determining proximity are also possible. For instance, scale 708B may be the closet to scale 708A, scale 708D may be the second closest to scale 708A, and scale 708C may be furthest from scale 708A. Accordingly, the multiple objects may be ranked in the order 710, in which 'B' is the object with an associated scale that is closest in proximity to the scale 708A. In some instances, the order 710 may be one of multiple factors used to help identify the second portion 706.

In another example, a first camera position used to render the synthetic training image of the object 704 may be determined based on information stored with the synthetic training image. Also, additional camera positions used to render the synthetic training images of multiple other objects matching the second portion 706 may be determined. Based on proximities of the additional camera positions to the first camera position, the multiple other objects may be ranked in terms of which object of the multiple other objects matches to the second portion most closely.

In some examples, an iterative method may be used to determine more information about a potential match between a portion of an image matching to an object. For example, lighting conditions associated with the image 700 may be determined based on information stored with the image 700. In one instance, metadata stored with the image 700 may indicate a timestamp and location of the image 700. Based on the timestamp and location information, appropriate illumination from sunlight may be determined, and an additional synthetic training image of the first object 704 may be rendered using the appropriate illumination. The additional synthetic training image and the first portion 702 of the query image may be compared by the visual object recognition module, and results of the comparison may be used to further determine whether the first object 704 matches to the first portion 702. In a further example, based on a compass reading from a device used to capture the image 700 and the first camera position of the image 700, background image data for the location in which the image 700 was taken may be extracted from a database. For instance, the database may include images that are indexed based on geographic location. The background image data may be used to render a synthetic training image of the object 704 with the background image data, and the synthetic training image with the background image data may be compared to the first portion 702.

In another example, if the first camera position of a closest matching synthetic training image to the first portion 702 is determined, additional synthetic training images of the multiple other objects may be rendered using the first camera position as a specification for a virtual view of the additional synthetic training images. The additional synthetic training images may than also be compared to the second portion 706 of the image 700 to determine more information about objects matching to the second portion 706. For instance, match scores from the comparison may be used to prioritize the multiple other objects in terms of objects most likely matching to the second portion 706.

Figure 8:
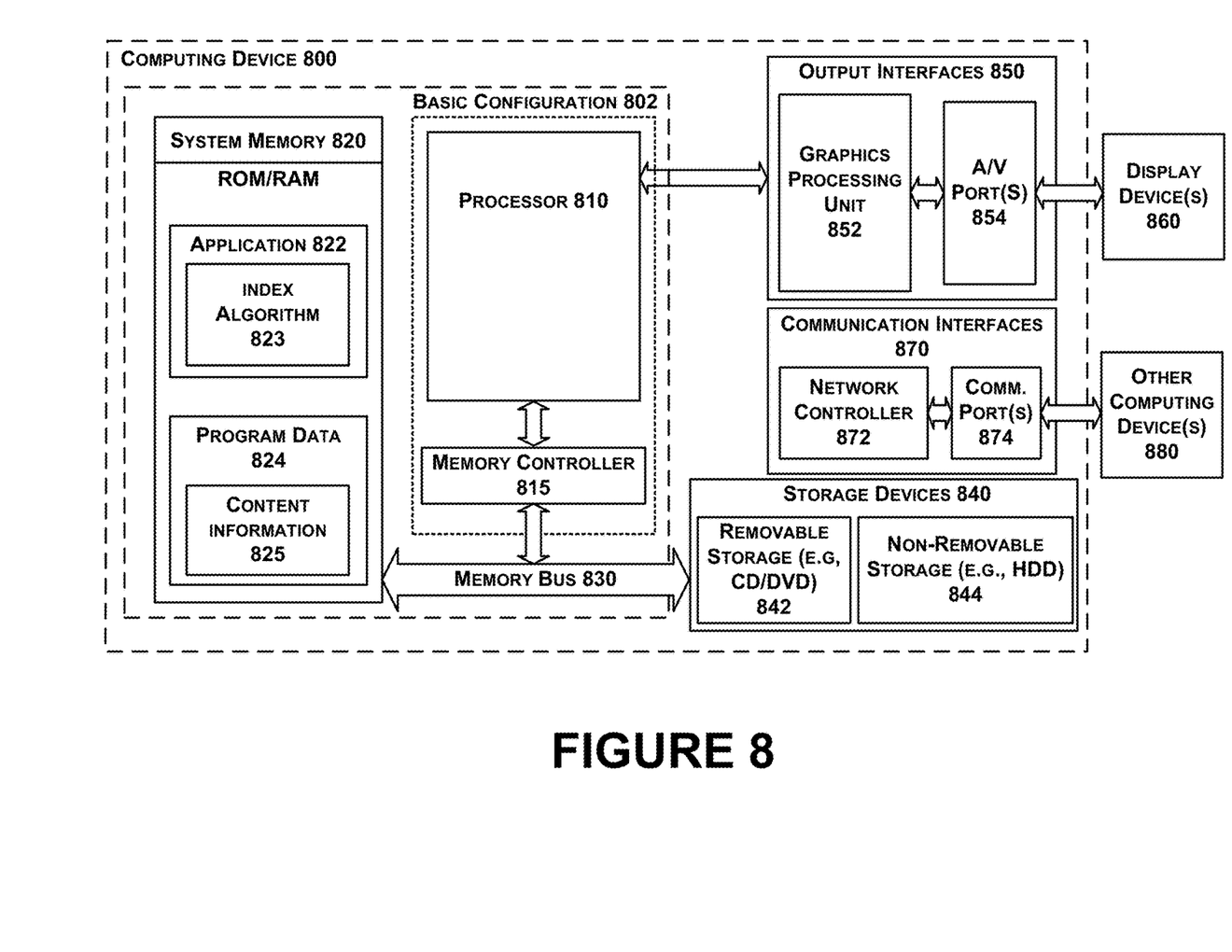
FIG. 8 is a functional block diagram illustrating an example computing device used in a computing system that is arranged in accordance with at least some embodiments described herein.

FIG. 8 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for rendering virtual views of three-dimensional (3D) data object models as described in FIGS. 1-7. In a basic configuration 802, computing device 800 may typically include one or more processors 810 and system memory 820. A memory bus 830 can be used for communicating between the processor 810 and the system memory 820. Depending on the desired configuration, processor 810 can be of any type including but not limited to a microprocessor (µP), a microcontroller (µC), a digital signal processor (DSP), or any combination thereof. A memory controller 815 can also be used with the processor 810, or in some implementations, the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 may include one or more applications 822, and program data 824. Application 822 may include an index algorithm 823 that is arranged to provide inputs to the electronic circuits, in accordance with the present disclosure. Program data 824 may include content information 825 that could be directed to any number of types of data. In some example embodiments, application 822 can be arranged to operate with program data 824 on an operating system.

Computing device 800 can have additional features or functionality, and additional interfaces to facilitate communications between the basic configuration 802 and any devices and interfaces. For example, data storage devices 840 can be provided including removable storage devices 842, non-removable storage devices 844, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 820 and storage devices 840 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include output interfaces 850 that may include a graphics processing unit 852, which can be configured to communicate to various external devices such as display devices 860 or speakers via one or more A/V ports or a communication interface 870. The communication interface 870 may include a network controller 872, which can be arranged to facilitate communications with one or more other computing devices 880 over a network communication via one or more communication ports 874. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

Figure 9:
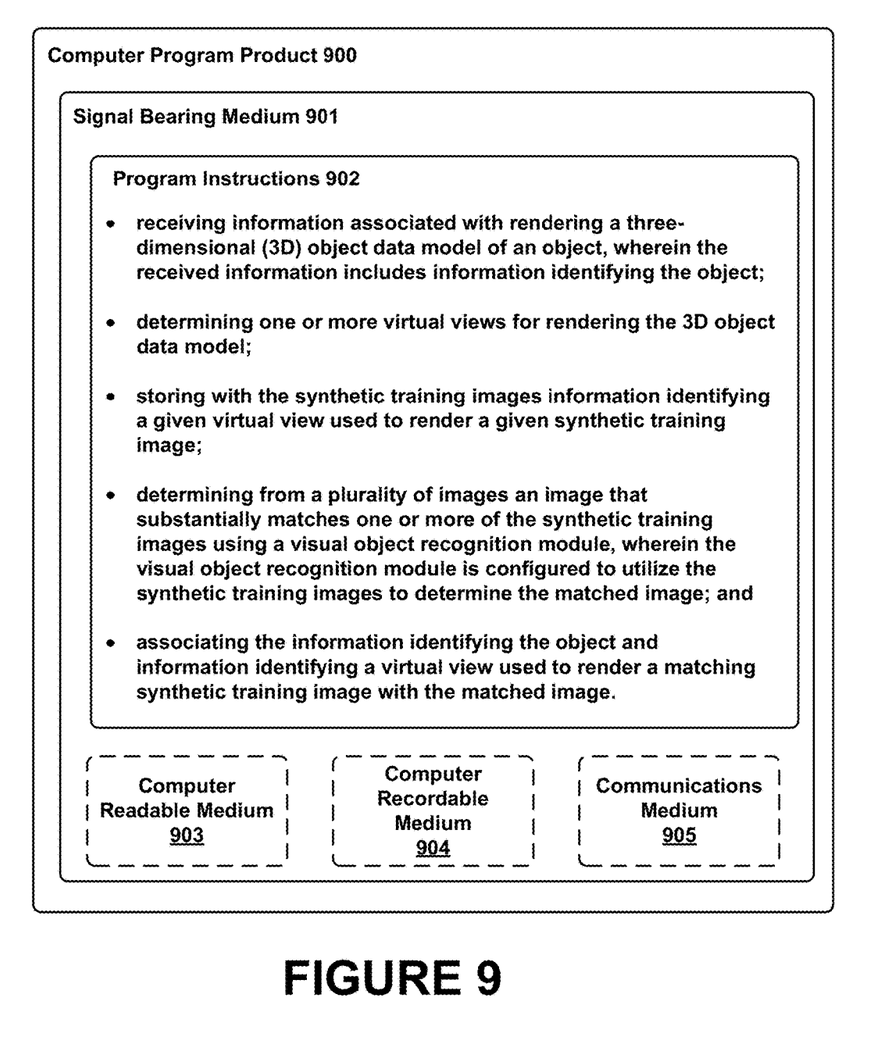
FIG. 9 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 9 is a schematic illustrating a conceptual partial view of an example computer program product that includes a computer program for executing a computer process on a computing device, arranged according to at least some embodiments presented herein.

In one embodiment, the example computer program product 900 is provided using a signal bearing medium 901. The signal bearing medium 901 may include one or more programming instructions 902 that, when executed by one or more processors may provide functionality or portions of the functionality described above with respect to FIGS. 1-8. In some examples, the signal bearing medium 901 may encompass a computer-readable medium 903, such as, but not limited to, a hard disk drive, a Compact Disc (CD), a Digital Video Disk (DVD), a digital tape, memory, etc. In some implementations, the signal bearing medium 901 may encompass a computer recordable medium 904, such as, but not limited to, memory, read/write (R/W) CDs, R/W DVDs, etc. In some implementations, the signal bearing medium 901 may encompass a communications medium 905, such as, but not limited to, a digital and/or an analog communication medium (e.g., a fiber optic cable, a waveguide, a wired communications link, a wireless communication link, etc.). Thus, for example, the signal bearing medium 901 may be conveyed by a wireless form of the communications medium 905 (e.g., a wireless communications medium conforming with the IEEE 802.11 standard or other transmission protocol).

The one or more programming instructions 902 may be, for example, computer executable and/or logic implemented instructions. In some examples, a computing device such as the computing device 800 of FIG. 8 may be configured to provide various operations, functions, or actions in response to the programming instructions 902 conveyed to the computing device 800 by one or more of the computer readable medium 903, the computer recordable medium 904, and/or the communications medium 905.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving information associated with rendering a three-dimensional (3D) object data model of an object, wherein the received information includes information identifying the object;
determining one or more virtual views for rendering the 3D object data model;
rendering synthetic training images of the object based on the one or more virtual views and the received information, wherein the synthetic training images are two-dimensional images;
storing with the synthetic training images information identifying a given virtual view used to render a given synthetic training image, wherein the information identifying the given virtual view includes information of one or more camera positions that describes a point of view of the 3D object data model from which the synthetic training images of the object are rendered;
in a computing device comprising one or more processors, matching a portion of an image of a plurality of images to one or more of the stored synthetic training images, wherein the computing device is configured to utilize the stored synthetic training images to determine the matched portion of the image; and
annotating the matched portion of the image with the information identifying the object and the stored information identifying a virtual view used to render a matching synthetic training image.

2. The method of claim 1, wherein the one or more virtual views include one or more lighting conditions of the 3D object data model.

3. The method of claim 1, further comprising:
associating with the matched portion of the image information indicating that the matched portion of the image matches a synthetic training image of the object.

4. The method of claim 1, wherein the plurality of images include frames from one or more videos and the matched portion of the image is a given frame of a given video, and the method further comprising associating with the given video information indicating the object is present in the given frame.

5. A non-transitory computer-readable medium having stored therein instructions executable by a computing device to cause the computing device to perform functions comprising:
receiving information associated with rendering a three-dimensional (3D) object data model of an object, wherein the received information includes information identifying the object;
determining one or more virtual views for rendering the 3D object data model;
rendering synthetic training images of the object based on the one or more virtual views and the received information, wherein the synthetic training images are two-dimensional images;
storing with the synthetic training images information identifying a given virtual view used to render a given synthetic training image, wherein the information identifying the given virtual view includes information of one or more camera positions that describes a point of view of the 3D object data model from which the synthetic training images of the object are rendered;
matching a portion of an image of a plurality of images to one or more of the stored synthetic training images, wherein the computing device is configured to utilize the synthetic training images to determine the matched image; and
annotating the matched portion of the image with the information identifying the object and the stored information identifying a virtual view used to render a matching synthetic training image.

6. The non-transitory computer-readable medium of claim 5, wherein the one or more virtual views include one or more lighting conditions of the 3D object data model.

7. A system comprising:
a processor; and
a data storage comprising instructions executable by the processor to:
render synthetic training images of an object based on one or more virtual views for a three-dimensional (3D) object data model of the object, wherein the synthetic training images are two-dimensional images;
store with the synthetic training images information identifying a given virtual view used to render a given synthetic training image, wherein the information identifying the given virtual view includes information of one or more camera positions that describes a point of view of the 3D object data model from which the synthetic training images of the object are rendered;
match a portion of an image of a plurality of images to one or more of the stored synthetic training images; and
annotate the matching portion with the information identifying the object and the stored information identifying a virtual view used to render a matching synthetic training image.

8. The system of claim 7, wherein the one or more virtual views include one or more lighting conditions of the 3D object data model.

9. The system of claim 7,
wherein the plurality of images include multiple frames from a video; and
wherein the processor matches a first frame to a first synthetic training image rendered using a first virtual view and matches a second frame to a second synthetic training image rendered using a second virtual view that is different from the first virtual view.

10. The system of claim 7, wherein the synthetic training images comprise synthetic training images of the object and a second object within a scene using multiple virtual views for the 3D object data model of the object and a second 3D object data model of the second object.

11. The system of claim 7, wherein the synthetic training images are rendered in proportion to a relative size of the object.

* * * * *